No. 884,032. PATENTED APR. 7, 1908.
J. MUHL.
NEST FOR HENS.
APPLICATION FILED APR. 15, 1907.
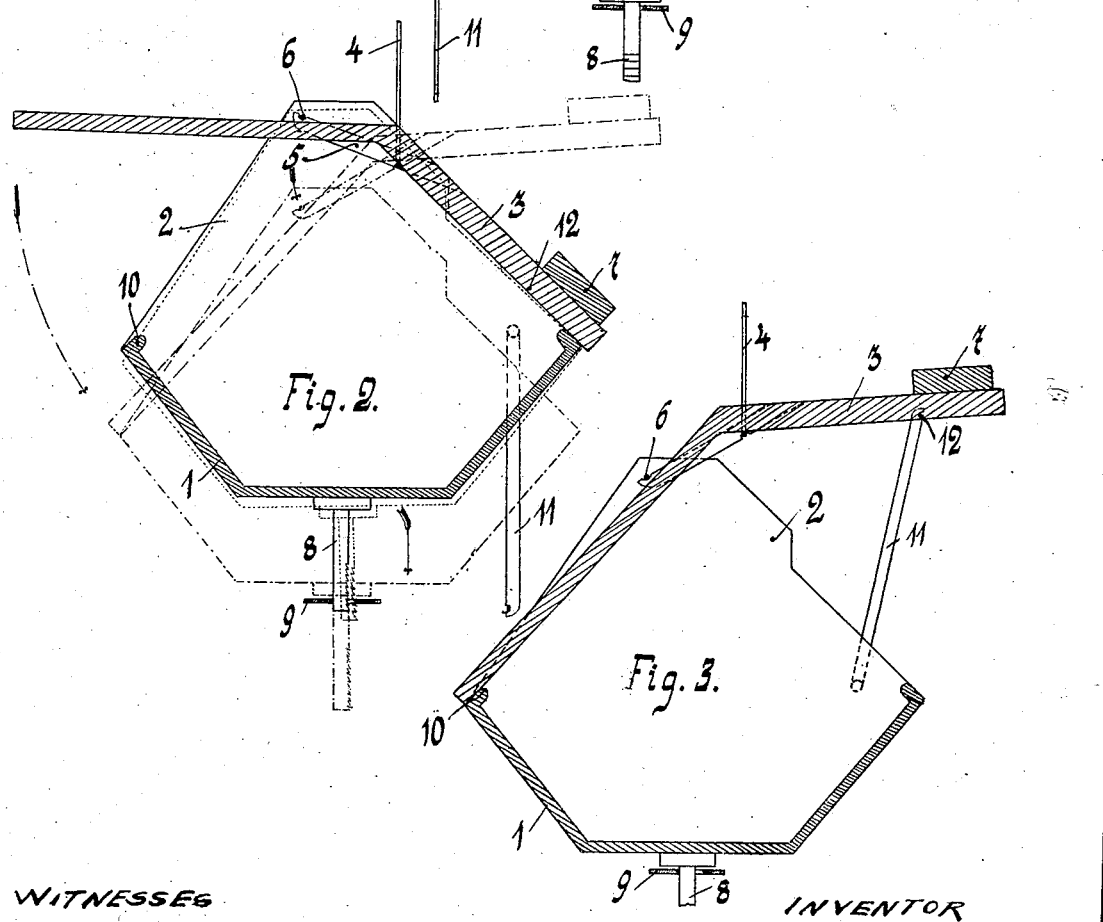
WITNESSES
INVENTOR
JOACHIM MUHL

UNITED STATES PATENT OFFICE.

JOACHIM MUHL, OF STRUKKAMP, FEHMARN, GERMANY.

NEST FOR HENS.

No. 884,032.  Specification of Letters Patent.  Patented April 7, 1908.

Application filed April 15, 1907. Serial No. 368,365.

*To all whom it may concern:*

Be it known that I, JOACHIM MUHL, farmer, subject of King of Prussia, residing at Strukkamp, Fehmarn, Germany, have invented new and useful Improvements in Nests for Hens, of which the following is a specification.

The present invention relates to a nest for hens, intended to prevent hiding of the eggs, to protect the hens when laying, and finally to control the laying of the hens.

The nest is provided in the known manner with two openings, one being accessible from the hen-house, the other leading to a special space, in which the hen remains after the egg has been laid. Both openings are closed by a double flap-door and the nest itself is suspended eccentrically from the flap door in such a manner, that upon the entering of a hen, the nest is lowered and one part of the door is raised, while the other is closed.

The accompanying drawing illustrates the invention. Figure 1 being a front view partly in section, and Fig. 2 is a sectional view showing the nest and door in several positions in full and dotted lines, and Fig. 3 is a sectional view showing the door and nest in a position different from that shown in full lines in Fig. 2.

The nest consists of the bottom part 1 and the side-walls 2. Between the side walls 2 a double flap door 3 is movably arranged, being suspended at its vertex by means of the hoop 4. The double-door is strengthened by means of iron bands 5, arranged on the sides and fastened to the door by means of screws. The bands project slightly at one end and are provided here with slots and recesses, from which the nest can be suspended by means of the pin 6. In this manner the nest is also carried by the hoop 4. The end of the right hand part of the double door is provided with a weight 7. The latter is chosen in such a manner, that it will hold the empty nest with the door in the position shown in Fig. 2. The left hand opening faces the hen-house, so that a hen may enter the nest underneath the open door. Owing to the load, the nest will be lowered, and the door will swing from the position as shown in full lines in Fig. 2 into that shown by the dot and dash line in said figure. The nest is then closed towards the hen-house, the hen is not disturbed by the other fowls nor driven away from the nest and can lay its egg in peace. The weighted part of the door 3 is now open so that the hen after the laying of the egg can leave the nest. The weighted part of the door 3 is then lowered thus closing the nest upon the right side and opening it again towards the hen-house, the nest at the same time being raised.

If a hen before entering the nest hops first on to the edge of it the door might close suddenly and drive the hen away. In order to prevent this, on the underside of the nest a serrated rod 8 has been provided, which moves in the slot of the fixed plate 9. The nest, as already mentioned, is suspended eccentrically. If, therefore, a hen hops on the edge 10, the nest will swing into the position shown in dotted lines in Fig. 2, owing to the eccentric weighting and also in consequence of the shock, which the nest receives, when the hen hops on to it. The serrated rod 8 grips the edge of the slotted plate 9, thus preventing a further lowering of the nest so that the nest for a short time is held in this position. If the hen hops into the nest and sits down on to the bottom, the nest will swing back again, the rod 8 with its serrations coming out of engagement with the plate 9, the nest is then lowered and the change of the closing door takes place in the manner previously described.

If the nest is to be used for sitting hens, it will not be necessary for the hens to pass through the nest. By means of the movable rod 11 which is pivoted to the nest, the nest can then be fixed in the position shown in Fig. 3, by raising the weighted part of the door and supporting it permanently by means of the rod 11.

What I claim is—

1. A nest for hens comprising a box having a bottom part and side walls, a double flap-door, means engaging with one flap of the door for suspending the door, means for suspending the box from the other flap and a weight on the opposite flap for counteracting the weight of the box.

2. A nest for hens comprising a box having a bottom part and side walls, a double flap door, means for eccentrically suspending the box from one flap of the door means for suspending the door from the other flap, a weight on said last mentioned flap for counterbalancing the weight of the box and means for preventing the lowering of the box before the hen reaches the bottom of the box.

3. A nest comprising a box having a bottom part and side walls, a double flap door to which the box is pivoted at one side of the center of said door, means for suspending the door from the other side of the center, a weight on the door for counterbalancing the weight of the box and means for holding the door closed on one side and the box lowered.

4. A nest comprising a box consisting of a bottom part and side walls, a double flap door arranged between the side walls of the box, means for suspending the box from one part of the door, a weight on the other part for counterbalancing the box and suspending means connected to the door between the weight and the box.

In testimony whereof I have signed my name to this specification in the presence of two subscribing witnesses.

JOACHIM MUHL.

Witnesses:
 JOHS. WULF,
 HEINR EHLERS.